United States Patent [19]

Cucksee et al.

[11] 4,128,441
[45] Dec. 5, 1978

[54] SOLUBILITY OF NPGA IN A POLYURETHANE BINDER

[75] Inventors: Marjorie T. Cucksee, Huntsville; Henry C. Allen, Decatur, both of Ala.

[73] Assignee: The United States of America as represented by the Secretary of the Army, Washington, D.C.

[21] Appl. No.: 856,437

[22] Filed: Dec. 1, 1977

[51] Int. Cl.$^2$ ............................................. C06B 45/10
[52] U.S. Cl. .................................. 149/19.92; 149/19.4
[58] Field of Search ............................ 149/19.4, 19.92

[56] References Cited

U.S. PATENT DOCUMENTS 3,811,967  5/1974  Strickler .............................. 149/19.4

Primary Examiner—Stephen J. Lechert, Jr.
Attorney, Agent, or Firm—Nathan Edelberg; Robert P. Gibson; Jack W. Voigt

[57] ABSTRACT

A method of mixing poly(neopentylglycol)azelate (NPGA) is disclosed which enhances its solubility in polyurethane binders for composite solid propellants. The method comprises withholding the addition of NPGA from the propellant submix and from the total propellant formulation mixing procedure until after the addition of the curing agent has taken place and reaction has taken place for a predetermined period of time with the bonding agent until a "break" in viscosity occurs. The "break" in viscosity has taken place when the other binder ingredients have reacted with the curing agent HDI (hexamethylenediisocyanate) so that immiscibility between the binder ingredients is reduced. The late NPGA addition method resulted not only in apparently complete solubilization of the NPGA but also yielded a propellant with dramatically lower end of mix viscosity (reduced by a factor of 10), superior flow characteristics, and better physical properties. Propellants made by the disclosed method of mixing have desirable lower modulus and higher tensile strength. Thus, the propellant mixed in accordance with the late NPGA addition method yields a propellant with a high tensile strength to modulus ratio. The high tensile strength to modulus ratio at low temperature is an indicator of a good propellant.

1 Claim, 4 Drawing Figures

SOLUBILITY OF NPGA IN A POLYURETHANE BINDER

DEDICATORY CLAUSE

The invention described herein may be manufactured, used, and licensed by or for the Government for governmental purposes without the payment to me of any royalties thereon.

BACKGROUND OF THE INVENTION

Poly(neopentylglycol)azelate (NPGA) is a polymer used in certain polyurethane binders for composite solid propellants.

Historically, in processing polyurethane propellants, all the binder ingredients, with the exception of the curing agent are combined in a submix. The solids including the cure catalyst are added to the submix after which the curing agent is added which cures the polyurethane propellant to a solid. NPGA as a propellant ingredient has contributed to desirable propellant ballistic properties but also occasionally has caused processing difficulties and poor mechanical properties. It has been determined that the unfavorable processing and the poor mechanical properties are related to the fact that NPGA has limited solubility in the mixture of other binder ingredients. As a result of lower NPGA solubility in the binder, processing problems have arisen as a result of increased propellant mix viscosity. The principal mechanical property effects are increased modulus at low temperatures, which imposes greater stresses on rocket motor bondlines, and decreased tensile strength, which reduces the propellant's capability to survive the greater stresses. The inferior propellant can then separate from rocket chamber liners or insulators at bondlines, thus causing anomalous motor performance and mission failure.

The correlation between the solubility of the NPGA and a normal variation in its production process has been established. The variations in processing causes a variation of NPGA molecular weight and/or hydroxyl content. The solubility of the NPGA in the submix decreases as its molecular weight increases and/or hydroxyl content decreases. Since the molecular weight and/or hydroxyl content are a result of normal variations in the production process, a different approach to solving the problem of decreased NPGA solubility in propellant binders is required other than controlling the production processing parameters for NPGA.

An object of this invention is to provide a method to ensure adequate solubility of NPGA in a polyurethane propellant binder.

Another object of this invention is to provide a method to ensure adequate solubility of NPGA in a polyurethane propellant binder as evidenced by effects on propellant viscosity and mechanical properties even when the NPGA contains a large high molecular weight fraction.

SUMMARY OF THE INVENTION

Investigation of the NPGA insolubility problem has shown that NPGA is more soluble in the reaction product formed by the curing agent and the other binder ingredients than in the unreacted submix alone. This finding has resulted in the discovery of a method for mixing propellants to obtain increased NPGA solubility which results in improved propellant properties.

The method of this invention comprises partially reacting the curing agent in the propellant to form reaction products of the curing agent and the other binder ingredients before NPGA is added. This is accomplished in the following manner. All of the binder ingredients except NPGA and the curing agent are blended together into a submix. The solid ingredients, which may include oxidizers, fuels, cure catalysts, ballistic modifiers or other additives, are incorporated into the submix by mixing to form a very viscous paste. After mixing sufficiently to obtain a homogeneous mixture, the curing agent is added and mixing is continued. Chemical reaction between the curing agent and other binder ingredients, particularly the C-1 diol, causes a sharp decrease in the viscosity of the mixture. This sharp decrease in viscosity has been termed a "break." The viscosity break indicates that enough reaction has occurred between the curing agent and other binder ingredients to enable the mixture to completely dissolve NPGA. When the NPGA is added after the viscosity break has occurred, the objects of this invention are achieved. When the NPGA is included in the submix, as has been the state of the art, it does not dissolve as the chemical reaction occurs because it is more reactive toward the curing agent than the other submix ingredients, and thus reacts preferentially with it to remain in the insoluble state.

DESCRIPTION OF THE PREFERRED EMBODIMENT

The method of this invention for mixing composite solid propellants employing NPGA in polyurethane binders is directed to the procedure for enhancing the solubility of NPGA. The method comprises withholding the addition of NPGA from the propellant submix and from the total propellant formulation mixing procedure until after the addition of the curing agent has taken place and reaction has taken place for a predetermined period of time with the other binder ingredients until a "break" in viscosity occurs.

The terminology "early addition of NPGA" refers to propellant mixing procedure wherein NPGA is mixed with binder premix before any solids are added which is the prior art. HDI is added after solids are added. The terminology "late addition of NPGA" refers to propellant mixing procedure wherein NPGA is added after all solids and HDI are incorporated and after a "break" in viscosity occurs. "Break" happens (with either late or early NPGA addition) when other reactive binder ingredients have reacted enough with HDI so that mutual solubility exists between the binder ingredients, and the mix goes from a dry to fluid condition in appearance.

The glossary below lists binder ingredients of a propellant submix by code designations and chemical names.

| GLOSSARY BINDR INGREDIENTS | |
|---|---|
| Code Designation | Chemical Name |
| NPGA | Poly(neopentylglycol)azelate |
| B2000 | poly(1,2 butyleneoxide)glycol |
| TP4040 | Polymeric 1,2 propylene oxide adduct of tri-methylolpropane |
| IDP | isodecylpelargonate |
| C-1 | N,N bis(2 cyanoethyl)2,3 dihydroxypropylamine |
| HDI | hexamethylenediisocyanate |

Figure 1:
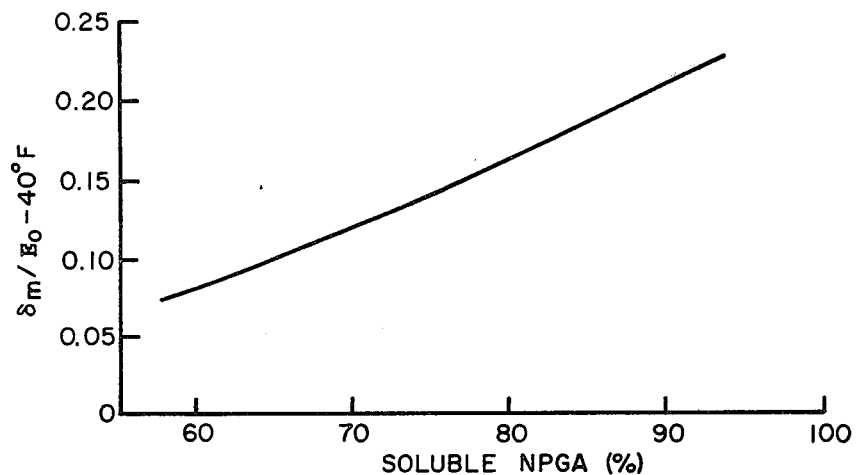
FIGS. 1 and 2 of the Drawings are plots of modulus values and plots of tensile strength to modulus ratios measured on propellants for control samples 161 and 8953 (early addition of NPGA, that is, NPGA in submix) and experimental samples 161 and 8953 (late addition of NPGA).
Figure 2:
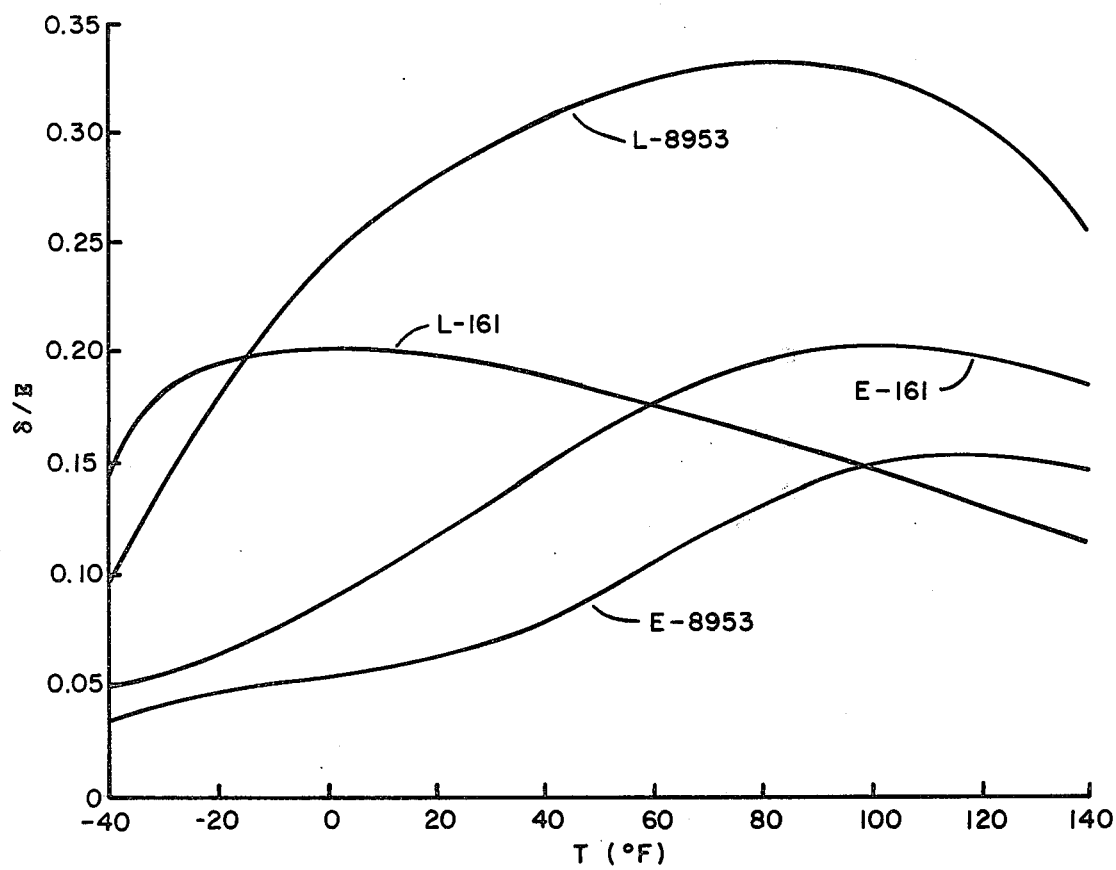

In further reference to the Figures of the Drawing, FIG. 1 shows the relationship of tensile strength ($\delta$) to modulus (E) ratios to solubility of NPGA. FIG. 2 shows that better $\delta$/E values are obtained with increasing solubility of NPGA. The curve E-161 as compared with curve E-8953 of FIG. 2 indicates that the $\delta$/E ratio is higher for more soluble lot 161 than for lot 8953. Lot 161 was one of the more soluble lots of NPGA when received, and lot 8953 was one of the least soluble lots of NPGA when received. Either batch when processed in accordance with the late addition method of this invention showed evidence that the NPGA had become soluble in the binder ingredients; that is, the reactions which had occurred in the binder prior to NPGA addition had made the binder a better solvent for NPGA. The shape of the curves L-161 and L-8953 indicates that the $\delta$/E ratio values had increased considerably at the low temperature range where higher $\delta$/E ratio values are more indicative of a good propellant.

Figure 3:
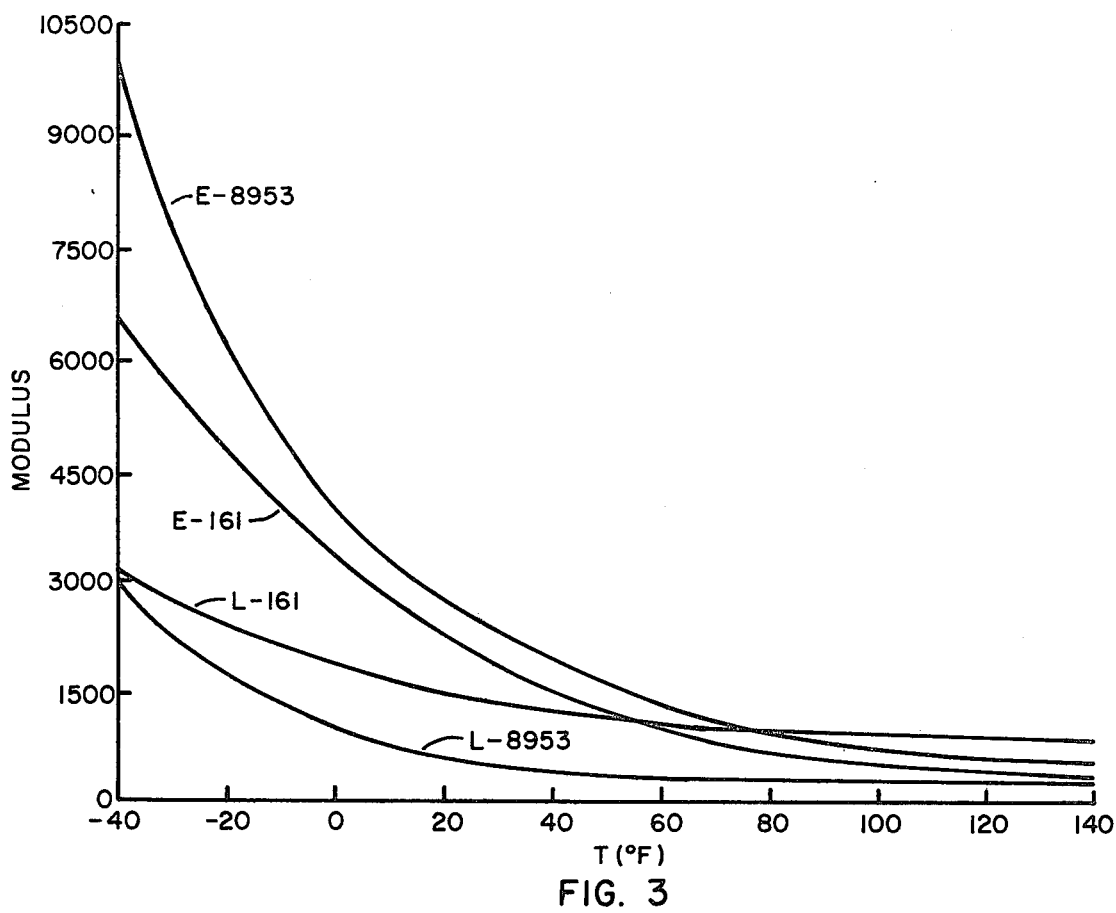
FIGS. 3 and 4 show the relationship of soluble NPGA % to 31 40° F. properties and the effect of end-of-mix viscosity on −40° F. properties respectively.

FIG. 3 shows curves E-161, L-161, E-8953, and L-8953. E and L in these designations stand for early and late addition of NPGA, respectively, as earlier defined herein. These curves show that low temperature modulus is significantly decreased by late NPGA addition, as desired. Table I compares NPGA lots 161 and 8953, which were judged to have good solubility and poor solubility respectively (as received). The Table shows that the lot with poor solubility (8953), when late addition of NPGA was employed, processed as well as the more soluble lot (161).

TABLE I

| NPGA Lot No. | NPGA Addition | Solubility (when received) | Processing Characteristics | End-of-Mix Viscosity |
|---|---|---|---|---|
| 161 | early | good | fair | 14.5 kp |
| 161 | late | good | excellent | 1.0 kp |
| 8953 | early | poor | poor | 18.0 kp |
| 8953 | late | poor | excellent | 1.0 kp |

Figure 4:
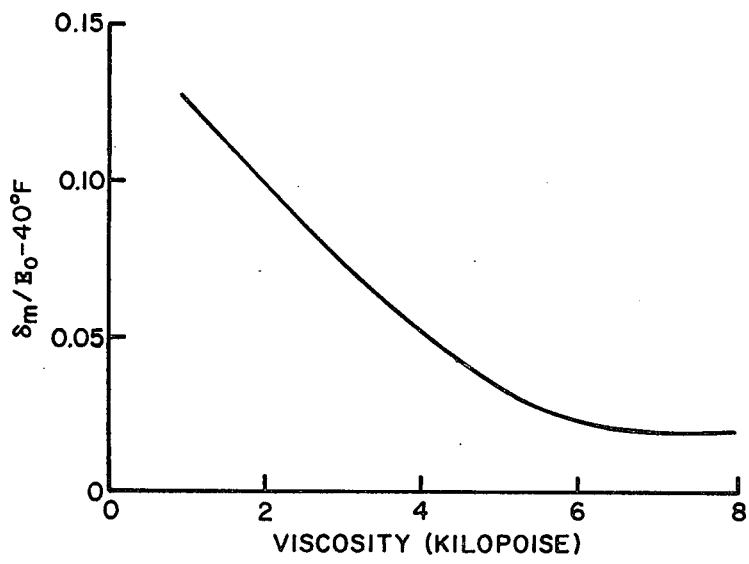

FIG. 4 is a plot of $\delta$/E ratios at $-40°$ F. vs end-of-mix viscosity values. This curve shows desirable increased $\delta$/E at $-40°$ with decreasing propellant viscosity. Table 1 shows that much lower propellant viscosity results when NPGA is added late. The overall processing and flow characteristics are tremendously improved.

An hypothesis has been formulated to account for the increased solubility and resultant benefits of late NPGA addition, which is as follows. NPGA contains primary hydroxyl groups which are much more reactive toward HDI than the secondary hydroxyl groups found in B2000 and TP4040. Thus when HDI is added to a mixture containing NPGA, B2000 and TP4040, as in the prior art, the HDI reacts more rapidly with NPGA than with B2000 or TP4040, linking NPGA molecules to other NPGA molecules. This type of reaction would be even more prevalent within the insoluble globules of NPGA which already are present when HDI is added, and would lead to blocks of NPGA molecules linked together which then could not dissolve later in the other binder ingredients. With late addition of NPGA, only B2000 and TP4040 initially are available to react with HDI(C-1 diol is also available, but does not enter into the hypothesized mechanism). Reaction of HDI with B2000 and TP4040 produces a substantial amount of "capping," that is, reaction between a hydroxyl group of B2000 or TP4040 and one isocyanate group on an HDI molecule. The product of this capping reaction is a B2000 or TP4040 molecule which now contains a urethane linkage and an isocyanate group. This modification of molecular structure makes the B2000 and TP4040 better solvents for NPGA when it is added later. Further, prior to NPGA addition, many of the HDI molecules have reacted through one isocyanate group and thus are no longer capable of linking NPGA molecules to other NPGA molecules. Reaction of NPGA with capped B2000 or TP4040 would strongly solubilize the NPGA which is necessary to obtain a homogeneous binder matrix. This combination of chemical effects resulting from late addition of NPGA render the NPGA soluble in the other binder ingredients, and produce the benefits described earlier.

We claim:

1. In a mixing process for a polyurethane propellant composition that is curable to a solid propellant grain wherein the binder ingredients consisting of poly(neopentylglycol)azelate, poly(1,2 butyleneoxide)glycol, polymeric 1,2 propylene oxide adduct of trimethylolpropane, isodecylpelargonate, and N,N bis(2 cyanoethyl)2,3 dihydroxypropylamine are combined in a propellant submix and wherein the solids ingredients comprising oxidizer, fuel, curing catalysts, and additives are added to and mixed thoroughly with said propellant submix and with subsequent addition and mixing of a curing agent hexamethylene-diisocyanate which cures said polyurethane propellant to a solid grain, the improvement in said mixing process which enhances the solubility of said poly(neopentylglycol)azelate in said polyurethane propellant composition comprising:

(i) combining and mixing together in a propellant submix said binder ingredients consisting of poly(1,2 butyleneoxide)glycol, polymeric 1,2 propylene oxide adduct of trimethylolpropane, isodecylpelargonate, and N,N bis(2 cyanoethyl)2,3 dihydroxylpropylamine;

(ii) adding and mixing said solid ingredients with said propellant submix;

(iii) adding and mixing said curing agent hexamethylenediisocyanate with said propellant submix and said solids and allowing said hexamethylenediisocyanate to partially react with said binder ingredients;

(iv) continue said mixing of said propellant submix, said solid ingredients, and said curing agent, which comprises the propellant mix, for a predetermined period of time until a break in viscosity occurs, said break in viscosity being evident when said propellant mix changes in appearance from a dry to a fluid condition; and (v) adding and mixing said poly(neopentylglycol)azelate with said propellant mix in which said poly(neopentylglycol)azelate exhibits enhanced solubility in said binder ingredients as evidenced by a lower end-of-mix viscosity and superior flow characteristics of the uncured polyurethane propellant composition, and as further evidenced by the improved physical properties of the cured polyurethane propellant composition, said improved physical properties including a higher stress to modulus ratio as compared with a like propellant composition in which said poly(neopentylglycol)azelate was added and mixed in said propellant submix during mixing process for polyurethane propellant composition.

* * * * *